(12) United States Patent
Akaba et al.

(10) Patent No.: US 12,278,524 B2
(45) Date of Patent: Apr. 15, 2025

(54) TEMPERATURE SENSOR AND ROTARY ELECTRIC MACHINE

(71) Applicant: SHIBAURA ELECTRONICS CO., LTD., Saitama (JP)

(72) Inventors: Hiroaki Akaba, Saitama (JP); Takamasa Yoshihara, Saitama (JP)

(73) Assignee: SHIBAURA ELECTRONICS CO., LTD., Saitama (JP)

(*) Notice: Subject to any disclaimer, the term of this patent is extended or adjusted under 35 U.S.C. 154(b) by 58 days.

(21) Appl. No.: 18/004,791

(22) PCT Filed: Dec. 17, 2020

(86) PCT No.: PCT/JP2020/047212
§ 371 (c)(1),
(2) Date: Jan. 9, 2023

(87) PCT Pub. No.: WO2022/130577
PCT Pub. Date: Jun. 23, 2022

(65) Prior Publication Data
US 2024/0162788 A1  May 16, 2024

(51) Int. Cl.
| H02K 11/25 | (2016.01) |
| G01K 1/08 | (2021.01) |
| G01K 1/14 | (2021.01) |
| G01K 7/22 | (2006.01) |

(52) U.S. Cl.
CPC .............. H02K 11/25 (2016.01); *G01K 1/08* (2013.01); *G01K 1/14* (2013.01); *G01K 7/223* (2013.01)

(58) Field of Classification Search
CPC . H02K 11/25; G01K 1/14; G01K 1/08; G01K 7/223

USPC ......................................................... 310/68 C
See application file for complete search history.

(56) References Cited

U.S. PATENT DOCUMENTS

| 2014/0184031 A1 | 7/2014 | Kaneshige |
| 2021/0215549 A1 | 7/2021 | Suzuki |

FOREIGN PATENT DOCUMENTS

| CN | 109073480 A | 12/2018 | |
| DE | 102013201835 A1 * | 8/2014 | ............ H02K 11/25 |
| EP | 413902 A * | 2/1991 | ............ G01K 1/143 |
| JP | 2003-092858 A | 3/2003 | |

(Continued)

OTHER PUBLICATIONS

WO-2017221464-A (Yoshihara, T) (Dec. 28, 2017) (Machine Translation) (Year: 2017).*

(Continued)

*Primary Examiner* — Mahmoud Gimie
(74) *Attorney, Agent, or Firm* — McDonald Hopkins LLC (57) ABSTRACT

A temperature sensor detecting a temperature of a coil provided in a stator of a rotary electric machine includes: a sensor element including a thermosensitive body, electric wires electrically connected to the thermosensitive body, and an elongated covering body enclosing a part of the electric wires and the thermosensitive body, and configured to be inserted into a gap formed by the coil along a longitudinal direction of the covering body; and a bracket including a fixed portion to be fixed to the stator, and a supporting portion pressing the sensor element against the coil while elastically supporting one end of the sensor element in the longitudinal direction.

16 Claims, 8 Drawing Sheets

(56) References Cited

FOREIGN PATENT DOCUMENTS

| | | |
|---|---|---|
| JP | 2010071708 A | 4/2010 |
| JP | 2010-252508 A | 11/2010 |
| JP | 2012178923 A | 9/2012 |
| JP | 2013-051806 A | 3/2013 |
| JP | 2014-178258 A | 9/2014 |
| KR | 101623382 B1 * | 5/2016 |
| WO | WO-2015121732 A2 * | 8/2015 ............. H02K 1/146 |
| WO | WO-2017221464 A1 * | 12/2017 ............... G01K 1/08 |
| WO | WO-2020175349 A1 * | 9/2020 |

OTHER PUBLICATIONS

International Search Report for PCT/JP2020/047212 dated Mar. 9, 2021.
Written Opinion for PCT/JP2020/047212 dated Mar. 9, 2021.
Office action for JP 202080101667.4 issued Apr. 24, 2023.
Office action for CN 202080101667.4 issued Apr. 24, 2023.

\* cited by examiner

TEMPERATURE SENSOR AND ROTARY ELECTRIC MACHINE

CROSS-REFERENCE TO RELATED APPLICATIONS

This is a National Stage application of PCT international application PCT/JP2020/047212, filed on Dec. 17, 2020, the content of which is incorporated herein by reference in its entirety.

TECHNICAL FIELD

The present invention relates to a temperature sensor suitable for detection of a temperature of a coil of a stator in a rotary electric machine.

BACKGROUND ART

For example, in a rotary electric machine such as an electric motor mounted on a vehicle, a temperature of a coil provided in a stator rises when a current flows through the coil. To avoid excessive temperature rise of the coil and to stably operate the rotary electric machine, the temperature of the coil is detected by using a temperature sensor, and operation of the rotary electric machine is controlled based on the detected temperature.

Patent Literature 1 proposes that, in a stator including a plurality of teeth, a temperature sensor is inserted into a gap formed between coils wound around the teeth adjacent to each other in a circumferential direction, to detect a temperature of one of the coils. A holder holding the temperature sensor in Patent Literature 1 is made of an elastic material. When the temperature sensor is inserted into the gap between the coils while the holder is elastically deformed, a temperature detection portion of the temperature sensor comes into contact with at least one of the coils.

CITATION LIST

Patent Literature

Patent Literature 1: JP 2010-252508 A

SUMMARY OF INVENTION

Technical Problem

It is necessary to prevent the temperature sensor detecting the temperature of the coil from being shifted from a prescribed position of the coil and being detached from the coil, under an environment where the temperature sensor receives vibration like a vehicle.

An object of the present invention is to provide a temperature sensor that can be prevented from being shifted in position to the coil and being detached from the coil, and a rotary electric machine including the temperature sensor.

Solution to Problem

According to the present invention, a temperature sensor detecting a temperature of a coil provided in a stator of a rotary electric machine, includes: a sensor element including a thermosensitive body, electric wires electrically connected to the thermosensitive body, and an elongated covering body enclosing a part of the electric wires and the thermosensitive body, and configured to be inserted into a gap formed by the coil along a longitudinal direction of the covering body; and a bracket including a fixed portion to be fixed to the stator, and a supporting portion pressing the sensor element against the coil while elastically supporting one end of the sensor element in the longitudinal direction.

In the temperature sensor according to the present invention, the supporting portion preferably presses the sensor element against the coil in a direction separating from a surface of a fixing region of the stator where the fixed portion is fixed.

In the temperature sensor according to the present invention, the bracket is preferably changed from a first posture in which the sensor element is inserted into the gap and the fixed portion is inclined to the fixing region, to a second posture in which the sensor element is pressed against the coil by the supporting portion with displacement of the fixed portion fixed to the stator.

In the temperature sensor according to the present invention, a step rising from the fixing region is preferably provided between the fixed portion and the supporting portion.

In the temperature sensor according to the present invention, the thermosensitive body is preferably positioned on the supporting portion side of the covering body, and the supporting portion preferably supports the covering body from the fixed portion side toward the supporting portion side, up to a position on the fixed portion side with respect to the thermosensitive body.

In the temperature sensor according to the present invention, the fixed portion is preferably fastened together with a core of the stator to a case of the stator by a bolt fixing the core to the case.

In the temperature sensor according to the present invention, the supporting portion preferably includes a joint portion to be joined to the covering body.

In the temperature sensor according to the present invention, the bracket preferably includes a locking portion locking to a locked portion to regulate rotation of the bracket with rotation of a bolt fixing the fixed portion to the stator.

In the temperature sensor according to the present invention, the electric wires preferably extend between the fixed portion and the locking portion of the bracket.

A rotary electric machine according to the present invention includes: a stator including a core and a coil; a rotor configured to be rotated to the stator; and the above-described temperature sensor configured to detect a temperature of the coil.

Advantageous Effects of Invention

According to the present invention, the fixed portion of the bracket can be fixed to the stator, and the sensor element can be pressed against the coil by elastic force of the supporting portion as a cantilever of the bracket. Therefore, it is possible to stably detect the temperature of the coil by the sensor element with high accuracy while preventing the sensor element from being shifted from a prescribed position of the coil and being detached from the coil caused by external force such as vibration and impact.

DESCRIPTION OF EMBODIMENT

An embodiment of the present invention is described below with reference to accompanying drawings.

[Entire Configuration]

Figure 1:
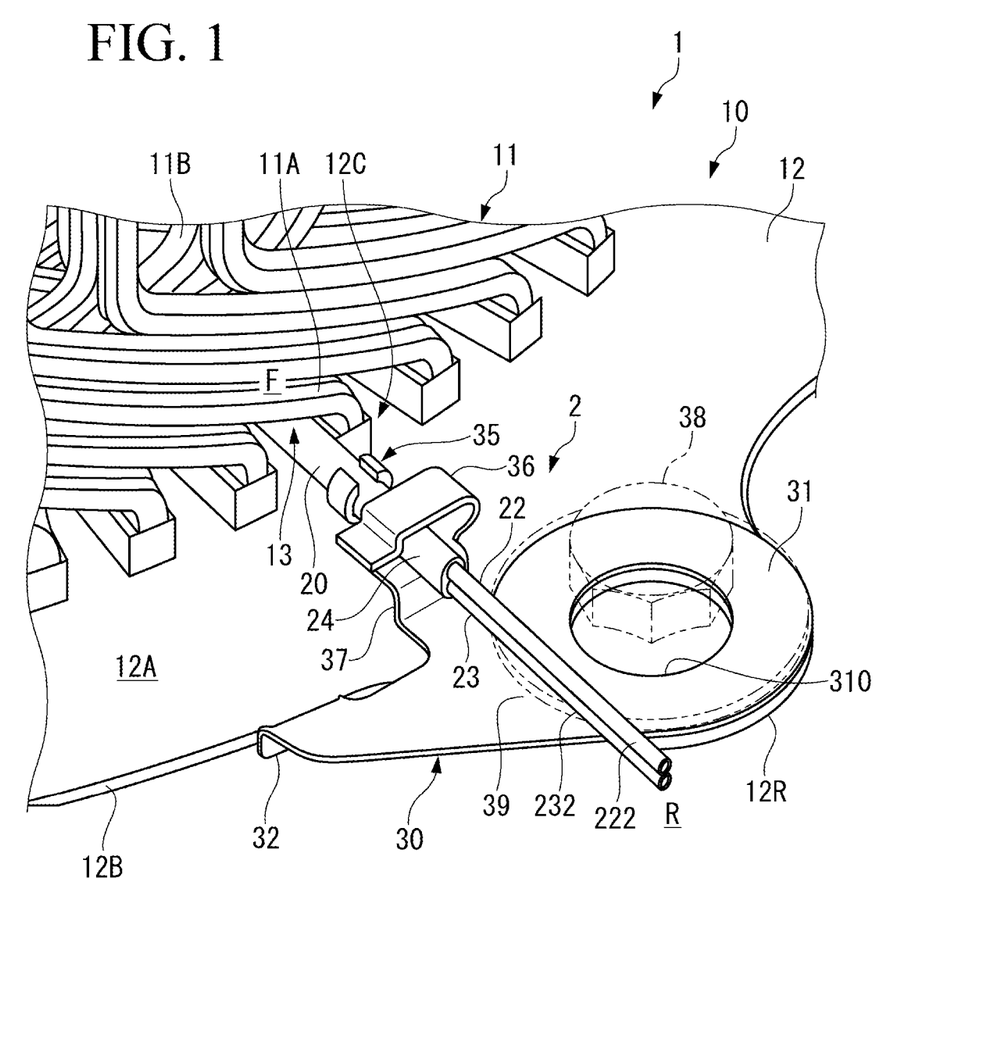
FIG. 1 is a perspective view illustrating a part of a stator of a rotary electric machine and a temperature sensor attached to the stator according to an embodiment of the present invention.

A temperature sensor 2 illustrated in FIG. 1 is attached to a stator 10 of a rotary electric machine 1 such as an electric motor, and detects a temperature of a coil 11 of the stator 10. The rotary electric machine 1 is mounted on a vehicle such as an electric automobile. The rotary electric machine 1 includes the stator 10, a rotor rotated to the stator 10, and the temperature sensor 2.

The stator 10 includes an unillustrated core that is a stacked body of a plurality of electromagnetic steel sheets, a case 12 housing the core, and the coil 11 that is wound around the core and is exposed to outside of the case 12.

Figure 2:
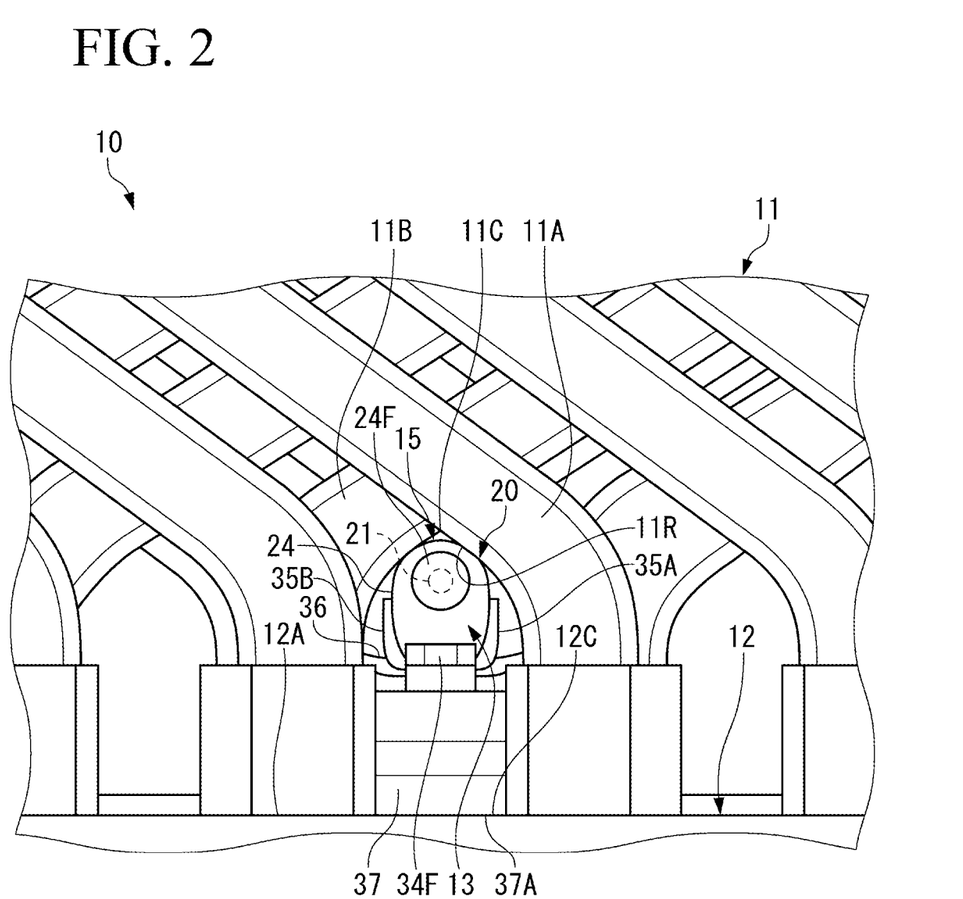
FIG. 2 is a diagram illustrating a state where the temperature sensor inserted into a gap formed by a coil of the stator is pressed by the coil, as viewed from a front end side (direction of arrow II in FIG. 6C) of the temperature sensor.

As illustrated in FIG. 1 and FIG. 2, the temperature sensor 2 is inserted into a gap 13 that is one of gaps formed by the coil 11 wound in a predetermined repetitive pattern on outside of the case 12, and is pressed against the coil 11. The gap 13 is formed, for example, inside a coil wire 11A and a coil wire 11B intersecting each other. The gap 13 extends, for example, along a diameter direction of the stator 10. Alternatively, the gap 13 extends along a direction inclined to a circumferential direction of the stator 10, relative to the diameter direction of the stator 10. The temperature sensor 2 is inserted into the gap 13 toward an inner peripheral side of the stator 10 from an outer peripheral side of the stator 10 through a gap between a surface 12A of the case 12 and both of the coil wire 11A and the coil wire 11B protruding to the outside of the case 12, and is pressed against both of the coil wires 11A and 11B.

In the following, a front side in a direction in which the temperature sensor 2 is moved relative to the stator 10 when the temperature sensor 2 is inserted into the gap 13 formed by the coil 11 is referred to as "front side", and a rear side in the direction is referred to as "rear side". In FIG. 1, FIG. 3A, FIG. 3B, FIG. 3C and the like, the "front side" is denoted by a reference symbol F, and the "rear side" is denoted by a reference symbol R.

Further, with a position of the temperature sensor 2 inserted into the gap 13 as a reference, a coil 11 side against which the temperature sensor 2 is pressed is referred to as an "upper side", and a side opposite thereto (case 12 side) is referred to as a "lower side".

Figure 3A:
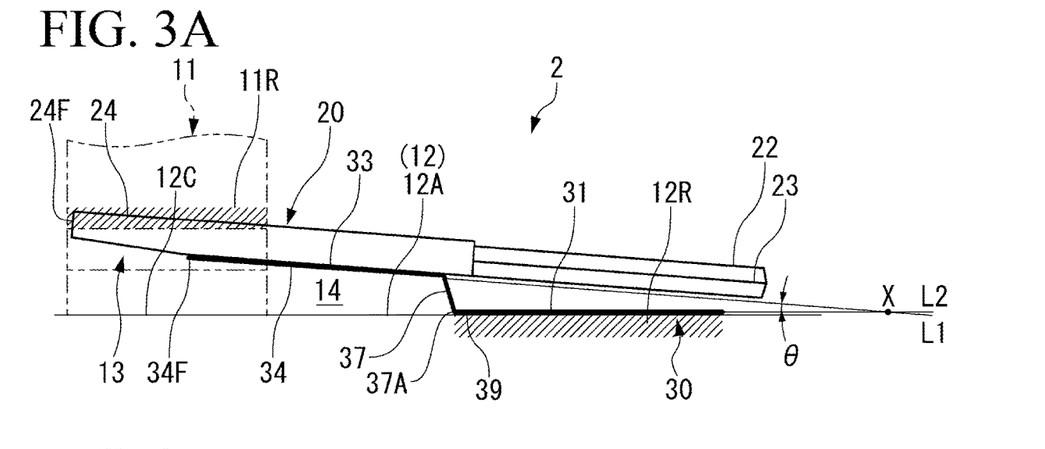
FIG. 3A is a schematic diagram illustrating a bracket in an unloaded state, the gap formed by the coil, and a case of the stator.

In FIG. 3A, the temperature sensor 2, the gap 13 formed by the coil 11, and the case 12 are schematically illustrated. The temperature sensor 2 in an illustrated state is not inserted into the gap 13. Further, the temperature sensor 2 is not fixed to the case 12.

A fixing region 12R of the case 12 where the temperature sensor 2 is fixed is positioned below a position of the gap 13, and is formed flat.

As a typical example, the fixing region 12R on the case 12 and a pressing region 11R of the coil 11 against which the temperature sensor 2 is pressed are provided in parallel to each other. The pressing region 11R corresponds to surfaces of the coil wires 11A and 11B facing the gap 13.

An under-coil region 12C present below the pressing region 11R is not necessarily continuous from the fixing region 12R on the case 12 and is not necessarily flat. In a case where any member is disposed below the coil 11, the member is not limited to the case 12, and may be the other member of the stator 10.

[Configuration of Temperature Sensor]

Figure 4:
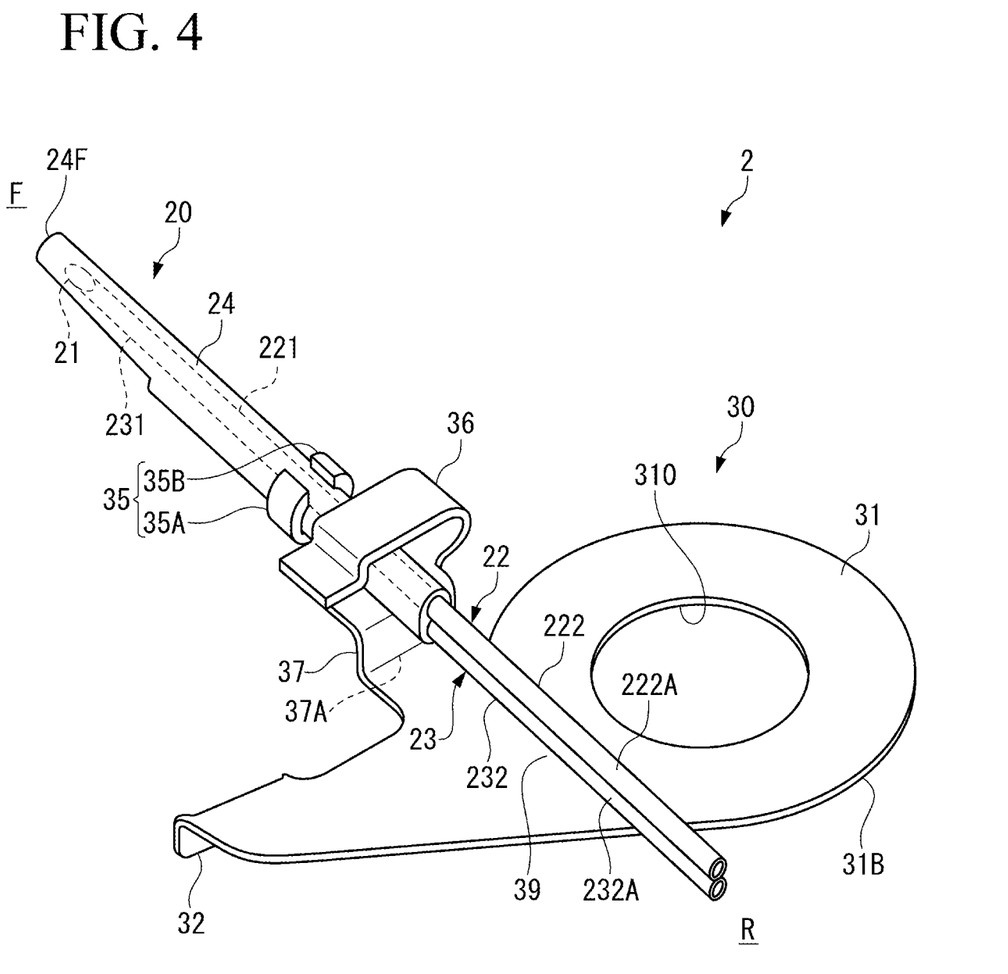
FIG. 4 is a perspective view illustrating the temperature sensor according to the embodiment, the temperature sensor including the sensor element and the bracket.
Figure 5A:
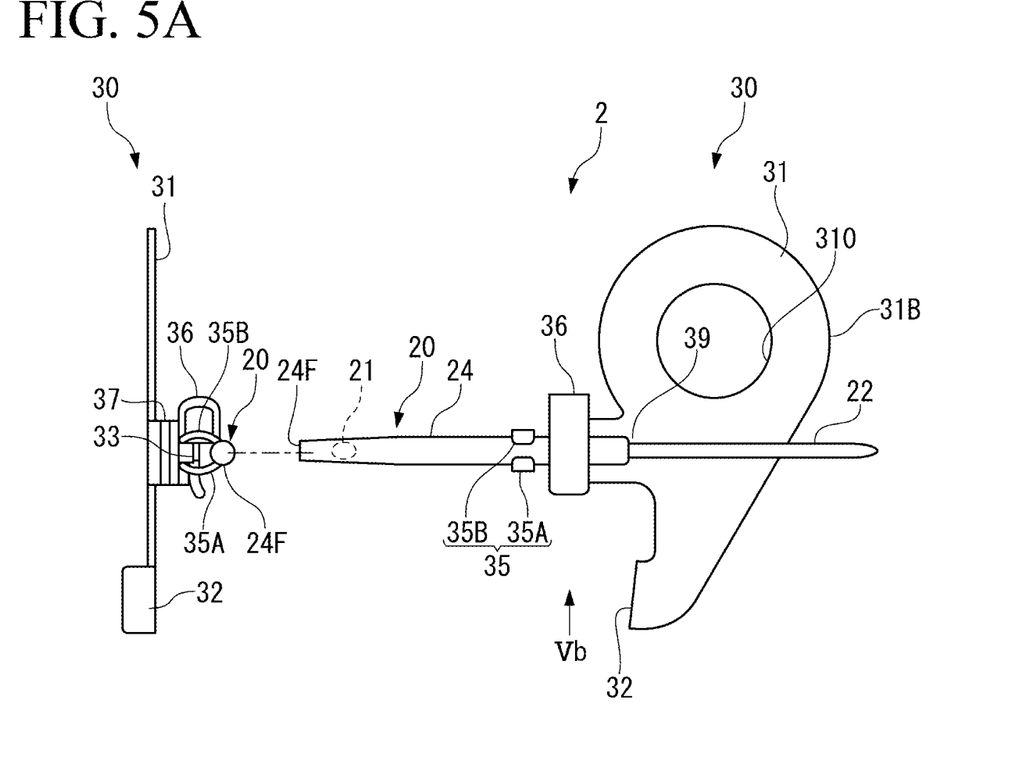
FIG. 5A is a plan view and a side view of the temperature sensor.
Figure 5B:
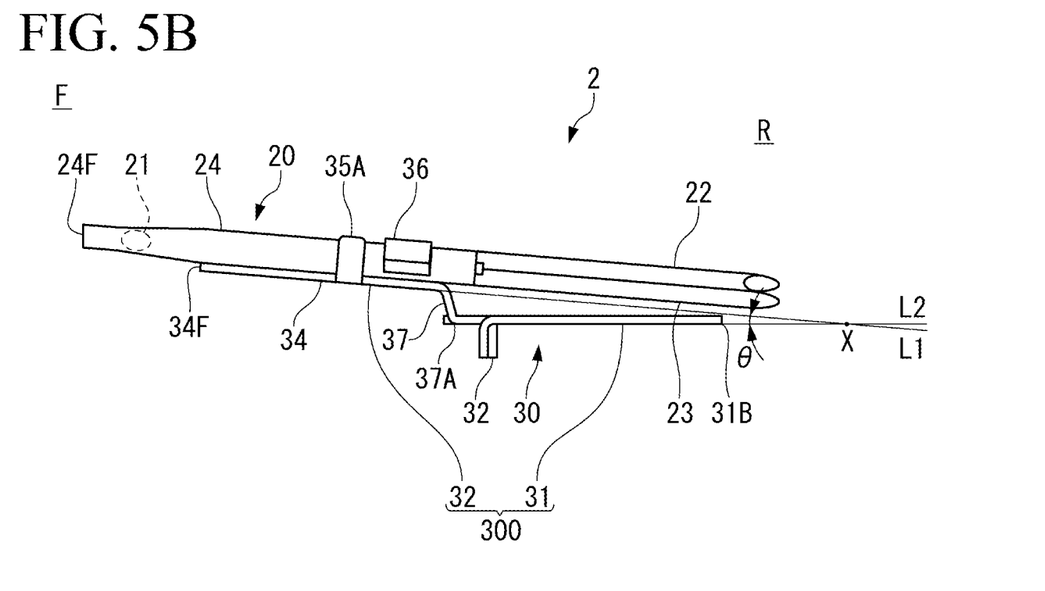
FIG. 5B is a side view of the temperature sensor as viewed from a direction of an arrow Vb in FIG. 5A.

A configuration of the temperature sensor 2 is described with reference to FIG. 4, FIG. 5A and FIG. 5B. The temperature sensor 2 includes a sensor element 20 detecting a temperature, and a bracket 30 that fixes the sensor element 20 to the case 12 and presses the sensor element 20 against the coil 11.

[Sensor Element]

The sensor element 20 includes a thermosensitive body 21, a pair of electric wires 22 and 23 electrically connected to the thermosensitive body 21, and a covering body 24 that has electric insulation property and encloses a part of the electric wires 22 and 23 and the thermosensitive body 21. The covering body 24 is formed in an elongated shape.

As the thermosensitive body 21, a thermistor or the like that is changed in electric resistance with temperature change is used. The thermosensitive body 21 is positioned near a front end of the sensor element 20.

The electric wires 22 and 23 are connected to respective unillustrated electrodes provided in the thermosensitive body 21, and are drawn out from the thermosensitive body 21 in the same direction. The electric wire 22 includes a first electric wire 221 such as a Dumet wire drawn out from the thermosensitive body 21, and a second electric wire 222 such as a lead wire connected to the first electric wire 221. The second electric wire 222 includes an insulation coating 222A, and a core wire thereof is connected to the first electric wire 221.

As with the electric wire 22, the electric wire 23 also includes a first electric wire 231 and a second electric wire 232 including an insulation coating 232A.

The second electric wires 222 and 232 are connected to an unillustrated temperature detection circuit.

The covering body 24 covers the whole of the thermosensitive body 21 and predetermined regions of the electric wires 22 and 23, thereby protecting the thermosensitive body 21 and the electric wires 22 and 23 from external force applied from outside. The covering body 24 extends rearward from a position ahead of the thermosensitive body 21 in a direction in which the electric wires 22 and 23 protrude from the thermosensitive body 21. A connection portion between the first electric wire 221 and the second electric wire 222 and a connection portion between the first electric wire 231 and the second electric wire 232 are covered with the covering body 24. The sensor element 20 is inserted into the gap 13 along a longitudinal direction of the covering body 24.

A predetermined range from a front end 24F to the rear side of the covering body 24 is inserted into the gap 13. The front end 24F is formed in a tapered shape. Therefore, the front end 24F is easily inserted into the gap 13.

The covering body 24 is made of a material such as a fluorine resin in a predetermined shape. Examples of the fluorine resin used for the covering body 24 include polytetrafluoroethylene (PTFE), and tetrafluoroethylene-perfluoroalkylvinylether copolymer (PFA).

The covering body 24 has a circular cross-section at the position of the thermosensitive body 21 near the front end 24F. On the rear side of the thermosensitive body 21, the covering body 24 has a cross-section in a shape approximate to an elliptical shape long in a direction in which the electric wires 22 and 23 are arranged. The cross-section of the covering body 24 is not limited to the present embodiment, and may have an appropriate shape, for example, a rectangular shape.

[Bracket]

The bracket 30 (FIG. 4, FIG. 5A and FIG. 5B) includes a fixed portion 31 fixed to the case 12 of the stator 10 by a bolt 38 (FIG. 1), a locking portion 32 locking the bracket 30 to the case 12 during rotation of the bolt 38, and a supporting portion 33 supporting the covering body 24 of the sensor element 20. The electric wires 22 and 23 of the sensor element 20 are drawn out from a rear end of the covering body 24, and extends rearward in an electric wire passing region 39 between the fixed portion 31 and the locking portion 32 of the bracket 30.

The fixed portion 31, the locking portion 32, and the supporting portion 33 of the bracket 30 are integrally formed by performing, for example, press processing such as stamping and folding on a plate material made of a metal such as stainless steel.

Note that the bracket 30 is not limited to the plate material made of the metal, and can be formed by using an appropriate resin material as long as the resin material has elasticity.

The fixed portion 31 is fastened together with an unillustrated core inside the case 12, to the case 12 by the bolt 38. In other words, the bolt 38 serves as a bolt fixing the core of the stator 10 to the case 12 and serves also as a bolt fixing the bracket 30 to the case 12.

The fixed portion 31 includes a through hole 310 into which a shaft portion of the bolt 38 used for fastening is inserted. The shaft portion of the bolt 38 reaches the core through the through hole 310 and an unillustrated through hole of the case 12. The fixed portion 31 is formed in a substantially annular shape, and is disposed in the fixing region 12R (FIG. 3A) that is a seat surface around the through hole of the case 12 by being fastened with the bolt 38.

Note that the shape of the fixed portion 31 is not limited to the annular shape, and may be an appropriate shape such as a rectangular shape.

The locking portion 32 is bent to a rear surface side (downward) relative to the fixed portion 31 at a position separated from a plane center of the through hole 310 in the bracket 30. The locking portion 32 is disposed to face a side surface 12B (FIG. 1) at an edge of the case 12 as a locked portion. When the bracket 30 attempts to rotationally move following rotation in fastening the bolt 38 having a right screw, the locking portion 32 locks to the side surface 12B. This regulates rotation of the bracket 30 with the rotation of the bolt 38.

Note that the member to which the locking portion 32 locks is not limited to the case 12, and may be an appropriate member on which the locking portion 32 abuts in fastening the bracket 30.

The supporting portion 33 as a cantilever elastically supports one end side (front end side) of the sensor element 20 in the longitudinal direction from below, and presses the sensor element 20 inserted into the gap 13 against the coil 11 in a direction separating from the surface of the fixing region 12R, namely, upward. The supporting portion 33 protrudes toward the side from the electric wire passing region 39, and extends along the longitudinal direction of the covering body 24.

A step 37 rising from the fixing region 12R is provided between the supporting portion 33 and the fixed portion 31. Providing the step 37 makes it possible to separate the case 12 and the supporting portion 33 by a predetermined distance over the whole of the supporting portion 33 in the longitudinal direction. A space 14 (FIG. 3A) is interposed between the case 12 and the supporting portion 33, which makes it possible to prevent the temperature of the stator 10 from influencing on the sensor element 20 through the supporting portion 33. Note that the temperature of the stator 10 is typically lower than the temperature of the coil 11. Further, a heat capacity of the stator 10 is greater than a heat capacity of the coil 11.

The supporting portion 33 forms a pressing mechanism 300 in cooperation with the fixed portion 31. As illustrated in FIG. 5B, the fixed portion 31 linearly extends rearward from the step 37, and the supporting portion 33 linearly extends forward from the step 37. In a side view of the bracket 30 illustrated in FIG. 5B, the fixed portion 31 and the supporting portion 33 are not on the same straight line or do not have parallel relationship, and one of the fixed portion 31 and the supporting portion 33 is inclined to the other.

A first extension L1 extending rearward from the fixed portion 31 and a second extension L2 extending rearward from the supporting portion 33 intersect each other at an intersection X on a rear side with respect to a rear end 31B of the fixed portion 31. An angle θ that corresponds to positions and dimensions of the fixing region 12R and the pressing region 11R, the extending directions of the fixing region 12R and the pressing region 11R, and the like is set between the first extension L1 and the second extension L2. Depending on the angle θ, the intersection X may be positioned on the front side with respect to the rear end 31B.

Figure 3B:
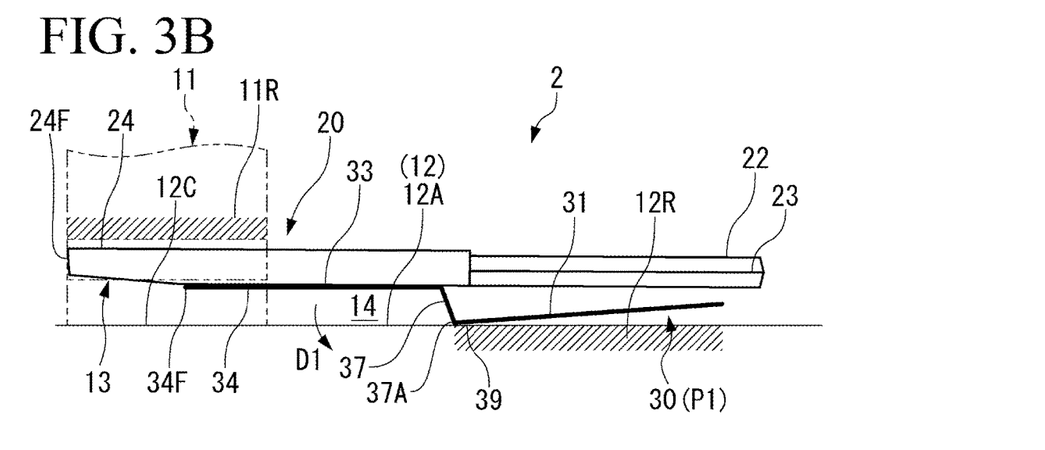
FIGS. 3B and 3C are schematic diagrams to explain a mechanism that presses a sensor element inserted into the gap against the coil with displacement of the bracket.
Figure 3C:
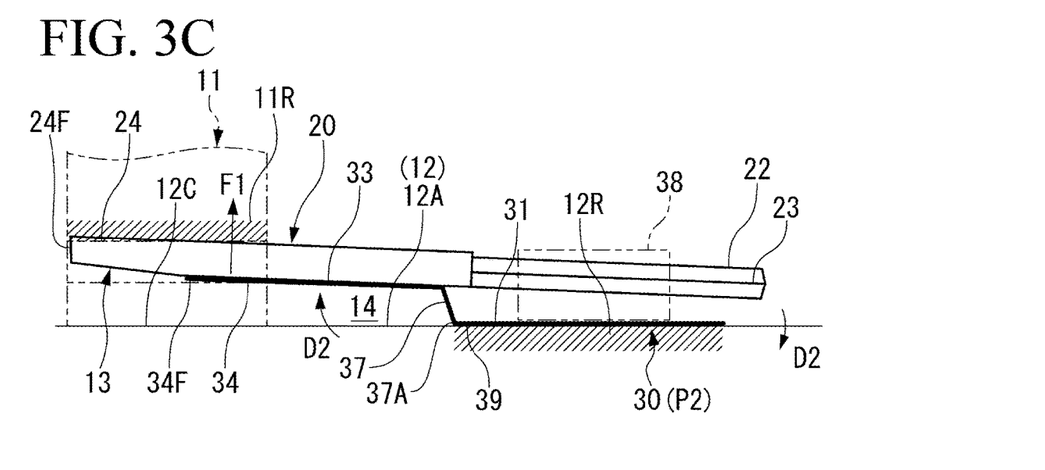

When the fixed portion 31 is fastened to the case 12, the supporting portion 33 moves with the fixed portion 31 that is pushed down toward the surface 12A of the case 12 with the fastening, and the sensor element 20 is sufficiently pressed against the coil 11 from below by the supporting portion 33, as illustrated in FIG. 3C.

The supporting portion 33 includes a supporting portion main body 34 supporting the covering body 24, and a first joint portion 35 and a second joint portion 36 joined to the covering body 24.

The supporting portion main body 34 extends from a position of the step 37 to a position on the fixed portion 31 side (rear side) with respect to the thermosensitive body 21. A width corresponding to a width on the rear end side of the covering body 24 is given to the supporting portion main body 34.

The supporting portion main body 34 is set to a length that is enough to obtain a predetermined elastic deformation amount so as to sufficiently press the sensor element 20 inserted into the gap 13 against the coil 11 by moving with the fixed portion 31 displaced in fastening. The elastic deformation amount enough to press the covering body 24 against the coil 11 with a predetermined load or more, at least at the thermosensitive body 21 and the vicinity thereof, is secured for the supporting portion main body 34.

In addition to securement of the predetermined elastic deformation amount for the supporting portion main body 34, a length of the supporting portion main body 34 is preferably shorter than a length of the sensor element 20 in order to avoid interference of the supporting portion main body 34 to the coil 11 and to reduce a material cost of the bracket 30.

The supporting portion main body 34 according to the present embodiment supports the covering body 24 from the fixed portion 31 side of the bracket 30 toward the supporting portion 33, up to the position on the fixed portion 31 side (rear side) with respect to the thermosensitive body 21. Therefore, although the covering body 24 protrudes forward from a front end 34F of the supporting portion main body 34, the elastic deformation amount enough to press the covering body 24 against the coil 11 at least at the thermosensitive body 21 and the vicinity thereof, is secured for the supporting portion main body 34.

The supporting portion main body 34 is inserted together with the covering body 24 into the gap 13. To protect the coil 11, the supporting portion main body 34 may be coated with a resin material or the like, at least over a range to be inserted into the gap 13.

The first joint portion 35 includes a pair of joint pieces 35A and 35B to be squeezed around the covering body 24 of the sensor element 20 in the width direction. The joint pieces 35A and 35B sandwich the sensor element 20 while being bent upward from the supporting portion main body 34. An area of the supporting portion main body 34 on the front side with respect to the first joint portion 35 is inserted into the gap 13 while supporting the sensor element 20.

The second joint portion 36 is disposed on a base end side (rear side) of the supporting portion main body 34 with respect to the first joint portion 35. The second joint portion 36 is squeezed together with the supporting portion main body 34 onto the covering body 24 in a vertical direction. The second joint portion 36 is bent upward from the supporting portion main body 34, and the second joint portion 36 and the supporting portion main body 34 sandwich the covering body 24. To sufficiently secure rigidity of the supporting portion 33, a width of each of the second joint portion 36 and the step 37 is greater than a width of the supporting portion main body 34.

[Attachment of Temperature Sensor to Stator]

A procedure of attaching the temperature sensor 2 to the stator 10 by using the bracket 30 is described.

Figure 6A:
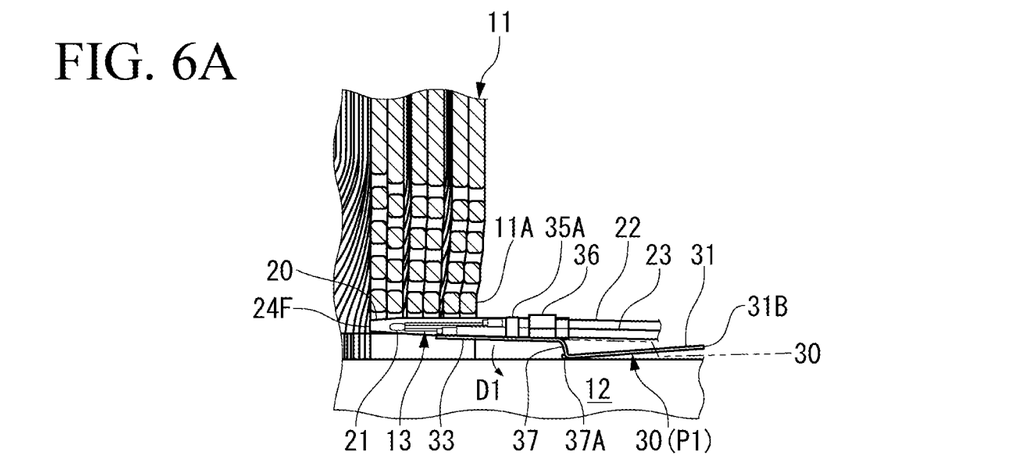
FIGS. 6A to 6C are diagrams to explain processes of inserting the sensor element into the gap formed by the coil, and subsequently fixing the bracket to the stator by a bolt to press the sensor element against the coil.

As illustrated in FIG. 6A, the sensor element 20 is inserted into the gap 13 formed by the coil 11 from an outer peripheral side of the stator 10 (insertion step). To insert the sensor element 20, the front end side of the supporting portion 33 is inclined downward as illustrated in FIG. 3B and FIG. 6A relative to a posture (reference posture) of the bracket 30 when the fixed portion 31 is parallel to the fixing region 12R as illustrated in FIG. 3A. In this state, the sensor element 20 and the supporting portion 33 can be smoothly inserted up to a predetermined position in an extending direction of the gap 13 along the extending direction of the gap 13. A direction (arrow D1) in which the bracket 30 is inclined at insertion corresponds to a counterclockwise direction in FIG. 3B and FIG. 6A.

The bracket 30 when the sensor element 20 is positioned on the rear side with respect to the gap 13 is illustrated by an alternate long and two short dashes line in FIG. 6A. As illustrated, prior to insertion, the front end of the sensor element 20 is preferably positioned to the gap 13 while a lower end 37A of the step 37 abuts on the surface 12A of the case 12. At this time, the front end side of the supporting portion 33 is inclined downward relative to the reference posture of the bracket 30.

When the bracket 30 is moved forward until the position of the through hole 310 of the fixed portion 31 is coincident with the position of the unillustrated through hole of the case 12 while the lower end 37A is slid to the case 12, the sensor element 20 and the supporting portion 33 can be stably inserted up to the predetermined position of the gap 13.

When the sensor element 20 and the supporting portion 33 are inserted into the gap 13 as illustrated in FIG. 6A, the bracket 30 is in a first posture P1 in which the fixed portion 31 is inclined to the fixing region 12R of the case 12. At this time, the rear end 31B of the fixed portion 31 is separated from the case 12.

Figure 6B:
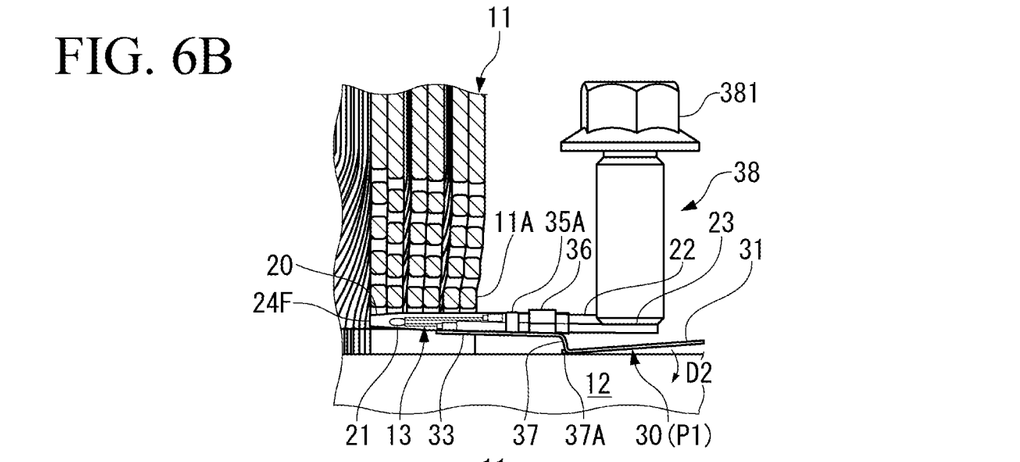
Figure 6C:
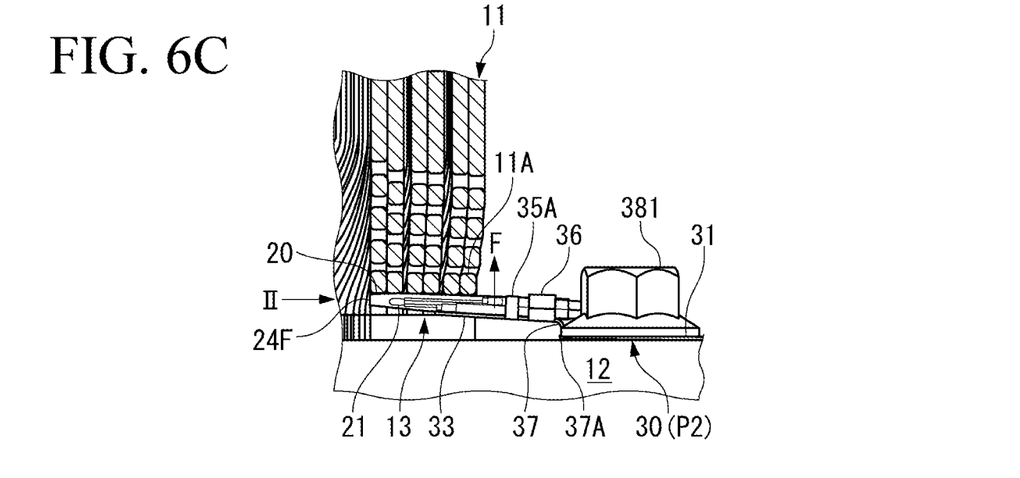

After the sensor element 20 is inserted into the gap 13, in the state where the bracket 30 is in the first posture P1, the fixed portion 31 is fastened to the fixing region 12R while the fixed portion 31 is pushed down by a head portion 381 of the bolt 38 as illustrated in FIGS. 6B and 6C (fixing step).

In fastening, the bracket 30 is changed to the second posture P2 in which the sensor element 20 is pressed against the pressing region 11R of the coil 11 from below by the supporting portion 33 moving with the fixed portion 31 while being displaced in the clockwise direction (arrow D2) in FIG. 6B such that the fixed portion 31 is parallel to the fixing region 12R (FIG. 6C and FIG. 3C). By the displacement in the clockwise direction at this time, the supporting portion 33 presses the sensor element 20 toward an intersection 11C of the coil wires 11A and 11B with elastic force F1 as illustrated in FIG. 2 while being elastically deformed.

After the fixed portion 31 and the core are fastened to the case 12 by the bolt 38, attachment of the temperature sensor 2 to the stator 10 is completed.

The covering body 24 of the sensor element 20 is in close contact with the coil wires 11A and 11B by the elastic force F1. This prevents the sensor element 20 from being shifted from the pressing region 11R and being detached from the coil 11. In addition, the sensor element 20 is thermally coupled to the coil 11 by close contact. This makes it possible to contribute to improvement in detection accuracy by the temperature sensor 2.

When the cross-section of the sensor element 20 is formed in a circular shape, an elliptical shape, or the like, the shape of the sensor element 20 is similar to the shape of the gap 13. In this case, it is possible to bring the coil 11 and the sensor element 20 into close contact with each other over the substantially entire pressing region 11R with the coil wires 11A and 11B except for a minute gap 15 (FIG. 2).

Varnish used for coating the coil 11 after the temperature sensor 2 is attached to the stator 10 may be flowed into and solidified in the gap 15.

In a case where the covering body 24 of the sensor element 20 is deformed following the shape of the pressing region 11R, the gap 15 is not necessarily formed, irrespective of the shapes of the sensor element 20 and the gap 13.

Widely securing an area of a heat input region from the pressing region 11R of the coil 11 to the sensor element 20 makes it possible to contribute to improvement in detection accuracy.

In the temperature sensor 2 according to the present embodiment described above, the fixed portion 31 of the bracket 30 can be surely fixed to the stator 10 by the bolt 38, and the sensor element 20 can be pressed against the coil 11 by the elastic force F1 of the supporting portion 33 as the cantilever of the bracket 30. Therefore, it is possible to stably detect the temperature of the coil 11 by the sensor element 20 with high accuracy while preventing the sensor element 20 from being shifted from the pressing region 11R of the coil 11 and being detached from the coil 11 caused by external force such as vibration and impact.

The bracket 30 can be assembled to the case 12 at the same time when the stator core is assembled to the case 12, by fastening the single bolt 38. This makes it possible to improve working efficiency of the assembly. In addition, the number of parts can be reduced to suppress the cost.

The sensor element 20 and the supporting portion 33 are integrated by the first joint portion 35 and the second joint portion 36. This regulates positional displacement of the sensor element 20 in the width direction and the vertical direction relative to the supporting portion 33 caused by external force such as vibration and impact. As a result, the sensor element 20 is pressed against the coil 11 by the supporting portion 33 while the posture of the sensor element 20 is stable. This makes it possible to contribute to improvement in detection accuracy.

The step 37 functions as a guide when the sensor element 20 and the supporting portion 33 are inserted into the gap 13. As a result, the sensor element 20 and the supporting portion 33 can be stably inserted into the gap 13 without causing the sensor element 20 and the supporting portion 33 to interfere with the coil 11.

In addition, since the step 37 allows the predetermined distance to be secured over the entire length of the supporting portion 33 between the case 12 and the supporting portion 33, it is possible to prevent the temperature of the stator 10 that is larger in heat capacitance than the coil 11 and is different in temperature from the coil 11, from being transferred to the sensor element 20 through the supporting portion 33 and influencing on temperature detection. As a result, it is possible to improve accuracy and responsiveness of temperature detection.

[Modifications of Bracket]

Figure 7A:
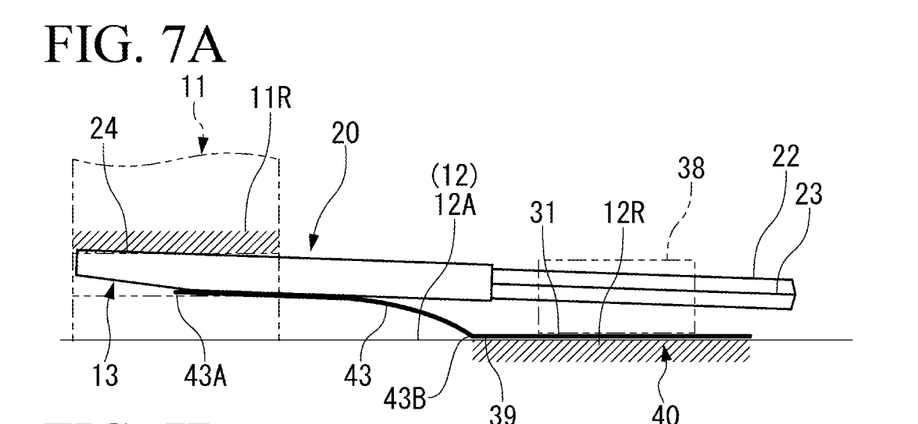
FIGS. 7A and 7B are schematic diagrams each illustrating a modification of the bracket.
Figure 7B:
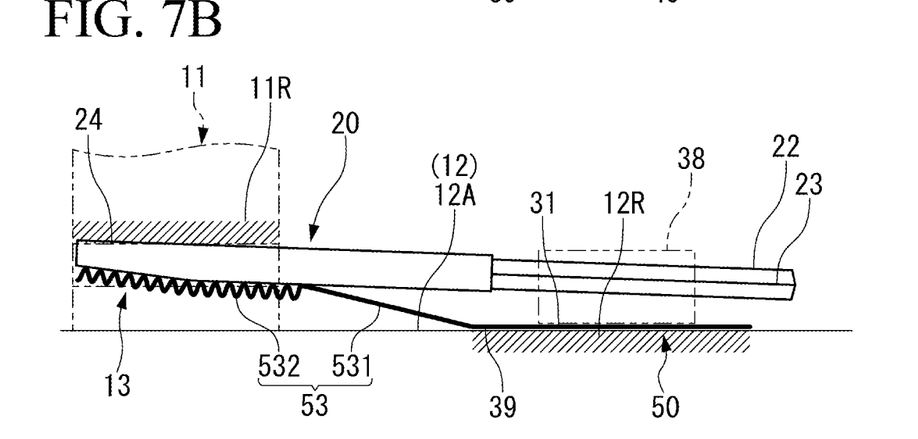
Figure 8A:
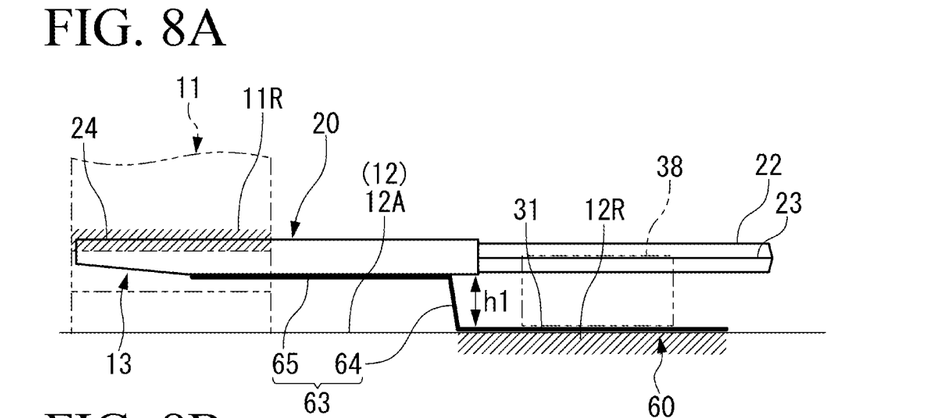
FIGS. 8A and 8B are schematic diagrams illustrating another modification of the bracket.
Figure 8B:
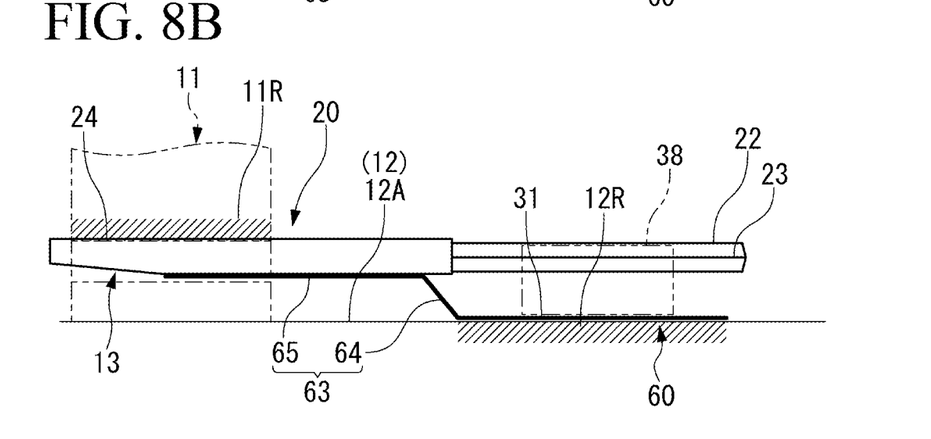

The temperature sensor 2 may include, for example, any of brackets 40 and 50 illustrated in FIGS. 7A and 7B and a bracket 60 illustrated in FIGS. 8A and 8B, in place of the bracket 30 according to the above-described embodiment.

The bracket 40 illustrated in FIG. 7A includes a curved supporting portion 43. The bracket 40 is not provided with the step 37.

The supporting portion 43 is continuous from the electric wire passing region 39 to the front side, and is curved so as to protrude upward. The supporting portion 43 is separated from the case 12 from a rear end 43B to a front end 43A.

By using the bracket 40, it is possible to fix the sensor element 20 to the case 12 and to press the sensor element 20 against the coil 11 through a procedure similar to the procedure in the case where the bracket 30 according to the above-described embodiment is used.

In other words, when the fixed portion 31 is fastened to the case 12 after the sensor element 20 and the supporting portion 43 are inserted into the gap 13 along the extending direction of the gap 13, the supporting portion 43 moves with the fixed portion 31 pushed down toward the fixing region 12R and is elastically deformed. Accordingly, it is possible to press the sensor element 20 against the coil 11 from below and to bring the sensor element 20 into close contact with the wires of the coil 11 by elastic force of the supporting portion 43.

A supporting portion 53 of the bracket 50 illustrated in FIG. 7B includes a first section 531 that is bent relative to the electric wire passing region 39 and linearly extends, and a second section 532 that is formed in a bellows shape and is continuous to the front side of the first section 531. The first section 531 extends forward from the electric wire passing region 39 so as to be gradually separated upward from the fixing region 12R. The second section 532 is formed by folding a plate material in a bellows shape in a side view from a direction orthogonal to a paper surface.

By using the bracket 50, it is also possible to fix the sensor element 20 to the case 12 and to press the sensor element 20 against the coil 11 through a procedure similar to the procedure in a case where the bracket 30 or 40 is used.

A supporting portion 63 of the bracket 60 illustrated in FIG. 8A includes a step 64 rising from the electric wire passing region 39, and a supporting portion main body 65 that is continuous from the step 64 to the front side and extends in parallel with the fixed portion 31. A height h1 of the step 64 is greater than a height of the step 37 according to the above-described embodiment. Therefore, before the sensor element 20 is inserted into the gap 13, the sensor element 20 supported by the supporting portion main body 65 is located above the position of the gap 13.

When the sensor element 20 is inserted into the gap 13 while the step 64 and the supporting portion main body 65 are elastically deformed in a direction approaching the case 12 as illustrated in FIG. 8B, the sensor element 20 can be pressed against the coil 11 by elastic force of the step 64 and the supporting portion main body 65. The sensor element 20 is pressed by the supporting portion 63 and the fixed portion 31 is fastened to the case 12, which makes it possible to prevent the sensor element 20 from being shifted from the pressing region 11R and being detached from the coil 11.

Although the preferred embodiment of the present invention is described above, the configurations described in the above-described embodiment can be selected or replaced with the other configurations without departing from the spirit of the present invention.

The bolt 38 fixing the fixed portion 31 of the bracket 30 or the like to the case 12 is not necessarily identical with the bolt fixing the stator core to the case 12. In other words, the fixed portion 31 can be fixed to the case 12 or the other member provided in the stator 10 by using a bolt different from the bolt fixing the stator core to the case 12.

The fixed portion 31 can be fixed to the member of the stator 10 by an appropriate method such as squeezing and bonding without being limited to fastening. For example, an inside of the through hole 310 of the fixed portion 31 and an inside of the through hole of the case 12 are filled with a resin material, and the resin material is cured, which makes it possible to fix the fixed portion 31 to the case 12.

In addition to the above-described brackets 30, 40, 50, and 60, a bracket that is formed in an appropriate shape and includes the fixed portion to be fixed to the stator 10 and the supporting portion pressing the sensor element 20 against the coil 11 while elastically supporting the sensor element 20 can be adopted.

REFERENCE SIGNS LIST

1 Rotary electric machine
2 Temperature sensor
10 Stator

11 Coil
11A, 11B Coil wire
11C Intersection
11R Pressing region
12 Case
12A Surface
12B Side surface
12C Under-coil region
12R Fixing region
13 Gap
14 Space
15 Gap
20 Sensor element
21 Thermosensitive body
22, 23 Electric wire
24 Covering body
24F Front end
30, 40, 50, 60 Bracket
31 Fixed portion
31B Rear end
32 Locking portion
33, 43, 53, 63 Supporting portion
34, 65 Supporting portion main body
34F Front end
35 First joint portion
35A, 35B Joint piece
36 Second joint portion
37 Step
37A Lower end
38 Bolt
39 Electric wire passing region
43A Front end
43B Rear end
64 Step
221, 231 First electric wire
222, 232 Second electric wire
222A, 232A Insulation coating
300 Pressing mechanism
310 Through hole
381 Head portion
531 First section
532 Second section
F Front side
R Rear side
F1 Elastic force
L1 First extension
L2 Second extension
P1 First posture
P2 Second posture
X Intersection
θ Angle

The invention claimed is:

1. A temperature sensor detecting a temperature of a coil provided in a stator of a rotary electric machine, the temperature sensor comprising:
a sensor element including a thermosensitive body, electric wires electrically connected to the thermosensitive body, and an elongated covering body enclosing a part of the electric wires and the thermosensitive body, and configured to be inserted into a gap formed by the coil along a longitudinal direction of the covering body; and
a bracket including a fixed portion to be fixed to the stator, and a supporting portion pressing one end of the sensor element in the longitudinal direction against the coil by an elastic force of the supporting portion while supporting the covering body.

2. The temperature sensor according to claim 1, wherein the supporting portion presses the sensor element against the coil in a direction separating from a surface of a fixing region of the stator where the fixed portion is fixed.

3. The temperature sensor according to claim 2, wherein the bracket is changed from a first posture in which the sensor element is inserted into the gap and the fixed portion is inclined to the fixing region, to a second posture in which the sensor element is pressed against the coil by the supporting portion with displacement of the fixed portion fixed to the stator.

4. The temperature sensor according to claim 2, wherein a step rising from the fixing region is provided between the fixed portion and the supporting portion.

5. The temperature sensor according to claim 1, wherein
the thermosensitive body is positioned on the supporting portion side of the covering body, and
the supporting portion supports the covering body from the fixed portion side toward the supporting portion side, up to a position on the fixed portion side with respect to the thermosensitive body.

6. The temperature sensor according to claim 1, wherein the fixed portion is fastened together with a core of the stator to a case of the stator by a bolt fixing the core to the case.

7. The temperature sensor according to claim 1, wherein the supporting portion includes a joint portion to be joined to the covering body.

8. The temperature sensor according to claim 1, wherein the bracket includes a locking portion locking to a locked portion to regulate rotation of the bracket with rotation of a bolt fixing the fixed portion to the stator.

9. The temperature sensor according to claim 8, wherein the electric wires extend between the fixed portion and the locking portion of the bracket.

10. A rotary electric machine, comprising:
a stator including a core and a coil;
a rotor configured to be rotated to the stator; and
the temperature sensor according to claim 1, configured to detect a temperature of the coil.

11. The temperature sensor according to claim 3, wherein a step rising from the fixing region is provided between the fixed portion and the supporting portion.

12. The temperature sensor according to claim 1, wherein the supporting portion presses an outer side of the covering body against the coil by the elastic force of the supporting portion.

13. A temperature sensor comprising:
a sensor element including a thermosensitive body, electric wires electrically connected to the thermosensitive body, and an elongated covering body enclosing a part of the electric wires and the thermosensitive body; and
a bracket including a supporting portion supporting the covering body and a fixed portion to be fixed to a fixed object,
wherein:
the supporting portion supports the covering body in a longitudinal direction of the covering body while avoiding a region of the covering body containing the thermosensitive body; and
the supporting portion is cantilevered by the fixed portion.

14. The temperature sensor according to claim 13, wherein the supporting portion is inclined to the fixed portion and is supported by the fixed portion.

15. The temperature sensor according to claim 14, wherein the bracket is made of a single metal plate, and the support portion and the fixed portion are connected to each other by a step that is inclined to both the support portion and fixed portion.

16. The temperature sensor according to claim 1, wherein the gap is formed between two adjacent coil wires.

* * * * *